United States Patent

Hutchinson et al.

[15] 3,668,528

[45] June 6, 1972

[54] HOUSING ASSEMBLY FOR MINIATURE RADIO APPARATUS WITH SELF CONTAINED BATTERY

[72] Inventors: Thomas R. Hutchinson, Oak Park; Edward J. Caper, Chicago, both of Ill.

[73] Assignee: Motorola, Inc., Franklin Park, Ill.

[22] Filed: Aug. 20, 1970

[21] Appl. No.: 65,453

[52] U.S. Cl..................................325/352, 136/173, 312/7, 325/119, 325/356, 325/361
[51] Int. Cl. .........................................................H04b 1/08
[58] Field of Search ....................317/101 R; 136/173; 312/7; 325/15, 119, 352, 353, 355, 356, 361

[56] References Cited

UNITED STATES PATENTS

| | | | |
|---|---|---|---|
| 2,692,944 | 10/1954 | Mendelson | 325/352 |
| 3,569,788 | 3/1971 | Niblack | 317/101 |
| 3,345,568 | 10/1967 | Errichiello et al. | 325/119 X |
| 2,508,918 | 5/1950 | Hines, Jr. | 325/352 |

*Primary Examiner*—Benedict V. Safourek
*Attorney*—Mueller and Aichele

[57] ABSTRACT

Housing assembly for miniature radio apparatus, such as a radio pager, having a molded frame member which supports the chassis and forms one end and two opposite sides of a housing. A U-shaped cover member slides in grooves in the frame member to form the other end and the other two sides of the housing, thereby providing a completely enclosed housing. Space for a battery is provided adjacent the end of the housing formed by the frame member, and the cover can slide with respect to the frame member to open the housing at that end to afford access to the battery. A detent is provided on the frame member which engages the cover member to hold the cover completely closed. A clip for holding the radio apparatus in a pocket includes a button to release the detent to permit the cover to slide for access to the battery. A second detent prevents further movement of the cover with respect to the housing preventing access to the radio chassis, with a key being required to release the second detent for removal of the cover from the frame member. Both single use and rechargeable batteries can be used, and contacts are provided in the housing for connecting the rechargeable battery to a charger.

16 Claims, 11 Drawing Figures

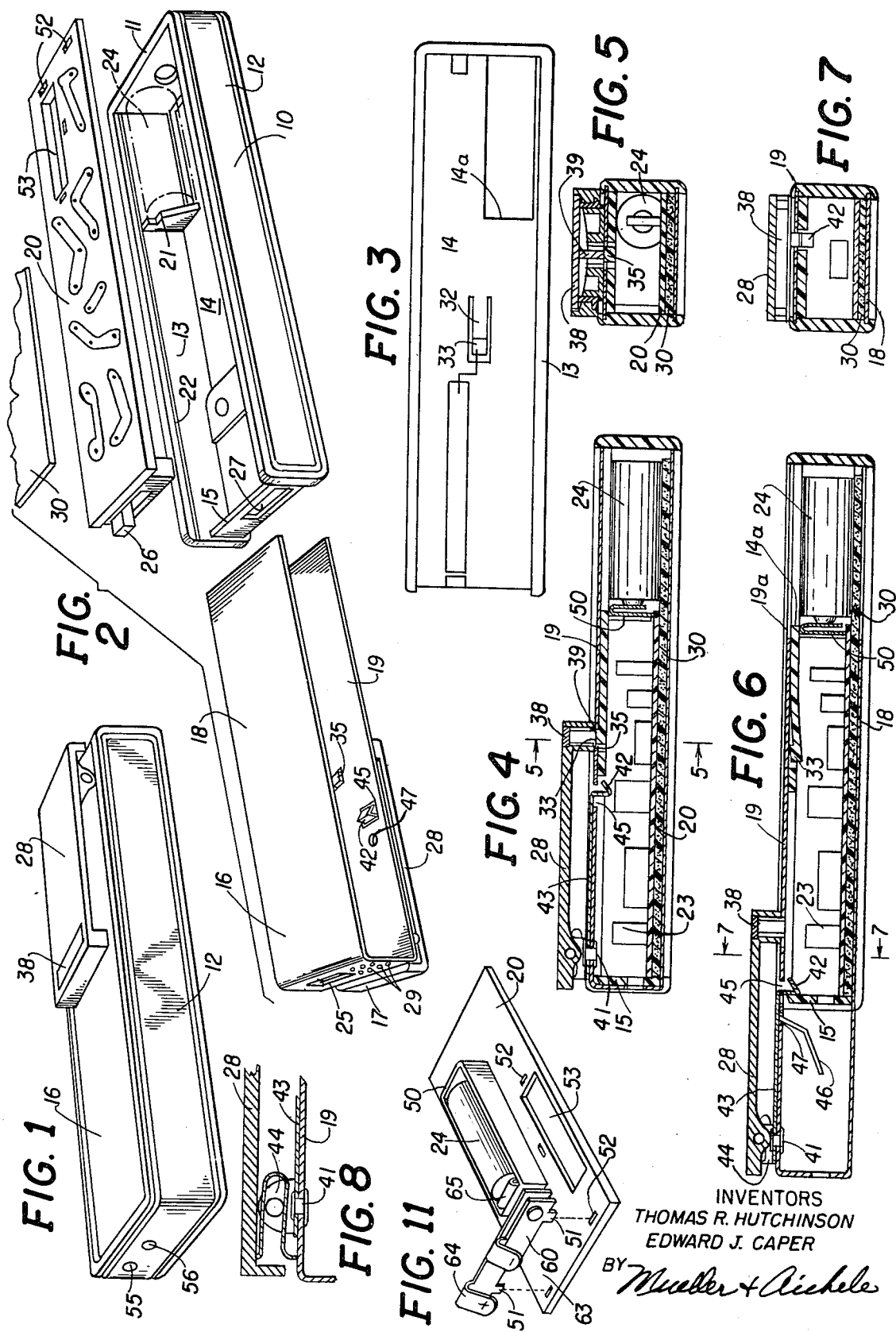

3,668,528

HOUSING ASSEMBLY FOR MINIATURE RADIO APPARATUS WITH SELF CONTAINED BATTERY

BACKGROUND OF THE INVENTION

In small radio apparatus, such as a radio receiver or pager, and which contains a battery for powering the apparatus, it is necessary to afford access to the battery for replacement of the same. It is known to provide a plastic frame member forming four or more sides of the housing, with a cover secured thereto, as by screws extending through openings of the cover and engaging inserts provided in the molded housing member. This has the objection that the inserts molded in the plastic housing to receive the screws involves substantial cost, and this construction also results in a high percentage of rejects, further increasing the cost. To prevent loss of the screws, captive machine screws may be used, which involves additional cost. Further, the screws have an objectionable appearance, and if not screwed in completely form projections which may catch on the pocket when the radio is inserted or removed to damage the same.

To provide access to the battery in the housing, various arrangements have been used, with some requiring removal of a cover secured by screws, which requires the use of a screw driver or coin when it is desired to change the battery. The cover for the battery may be a small button with threads or other interlocking projections, but a small cover has the objections that it is easily lost or misplaced. In some cases, plastic members with engaging projections have been used to cover the battery compartment, but these do not provide a secure fastening after being removed a number of times.

Another problem in prior miniature radio housing and chassis arrangements is that connections are required between the housing and the chassis, particularly to provide connections to the battery. This requires disengagement of connections when removing the chassis from the housing, which increases the maintenance time. Also it is desired to be able to use both single use (Mercury) and rechargeable (Nicad) batteries, and to be able to recharge the battery without removing it from the housing.

SUMMARY OF THE INVENTION

It is an object of this invention to provide a housing assembly for miniature battery operated radio apparatus wherein screws are not required for assembly of the members forming the housing, and the housing can be opened to provide access to the battery, without the use of tools.

Another object of the invention is to provide a housing structure for a miniature radio device having a frame member and a cover member which co-operate to form a completely enclosed housing, and wherein the cover member is slidable with respect to the frame member and is held in closed position by a first detent, and in a position providing access to the battery by a second detent.

A further object of the invention is to provide a housing arrangement for a miniature radio apparatus wherein the housing can be opened to give access to the battery without the use of any tools, and can be opened to provide access to the chassis only by use of a special key or tool.

A still further object of the invention is to provide a housing and chassis arrangement for a miniature radio for receiving and connecting both single use (Mercury) and rechargeable (Nicad) batteries, with external contacts for charging the rechargeable battery which are not connected to the single use battery.

The miniature battery operated ratio apparatus of the invention includes a frame member having provisions for receiving a radio chassis and a battery for powering the chassis. The frame member may be molded of plastic material and has portions forming one end and two opposite sides of a housing for apparatus. A U-shaped cover member is slidably positioned in grooves in the frame member and forms two opposite sides of the housing, which are at right angles to the two sides formed by the frame member, and the second end of the housing. The cover member includes a clip for holding the radio apparatus, which may be a radio pager, in the pocket of the person using the same. A detent structure secured to the frame engages an aperture in the cover to hold the cover completely closed. The clip has a button arranged to release the detent so that the cover can be slid on the frame member to expose the battery compartment to permit installing or removal of the battery. A second detent prevents the cover from being further removed so that it protects the radio chassis. This second detent includes a resilient member which requires a tool to release the same to thereby protect the radio chassis and components from exposure and objectionable tampering by the user. The chassis has contacts for engaging both single use and rechargeable batteries, and contacts are provided in the housing which are connected only to the rechargeable battery for charging the same without removal from the housing.

BRIEF DESCRIPTION OF THE DRAWINGS

FIG. 1 is a perspective view of a radio pager in accordance with the invention;

FIG. 2 is an exploded view of the pager of FIG. 1 showing the housing parts and the chassis;

FIG. 3 is a plan view of the back side of the molded frame member of the housing;

FIG. 4 is a cross-sectional view of the pager with the housing closed;

FIG. 5 is a cross-sectional view along the lines of 5—5 of FIG. 4;

FIG. 6 is a cross-sectional view with the cover partially open to expose the battery;

FIG. 7 is a cross-sectional view along the lines 7—7 of FIG. 6;

FIG. 8 shows the hinge and spring structure for the clip;

DETAILED DESCRIPTION

Figure 9:
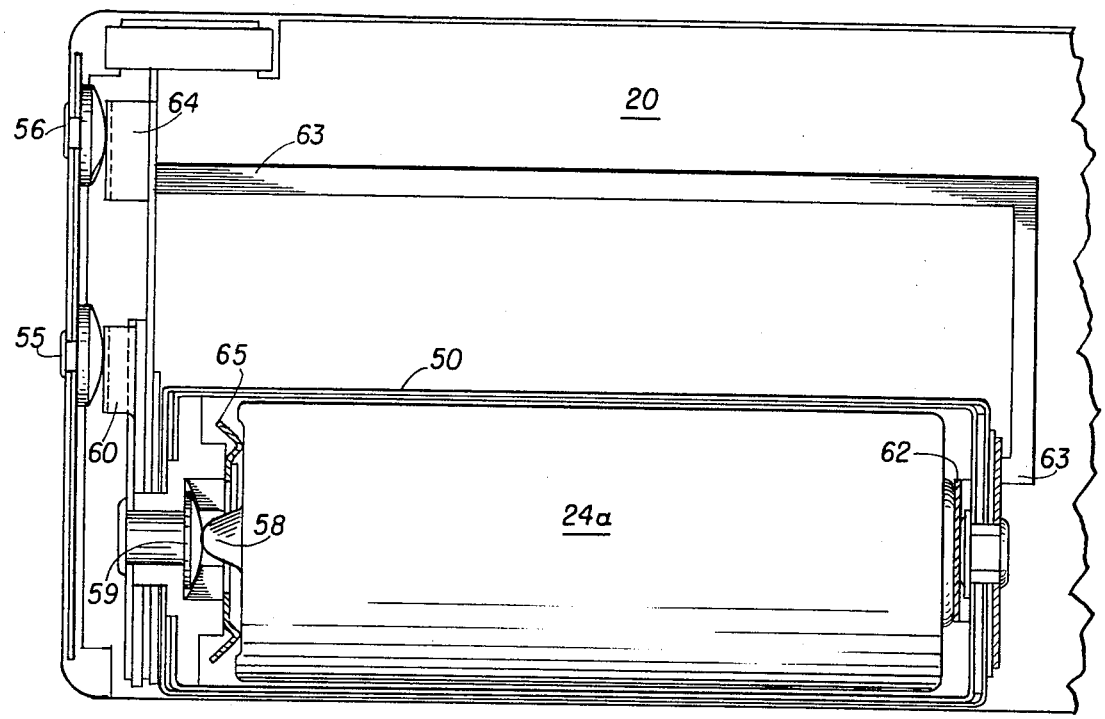
FIGS. 9 and 10 show the housing with rechargeable and single use batteries therein and the connections thereto; and, FIG. 11 is an exploded perspective view of the battery holder.

The radio apparatus of the invention is shown in FIG. 1, and is illustrated as a radio pager. It will be apparent that the housing arrangement can be used for other devices. FIG. 2 shows the parts in exploded relation and the invention will be described in connection with FIGS. 1 and 2.

The housing includes a molded member 10 which forms a frame for supporting the chassis 20, and which also forms one end 11 and a pair of opposite sides 12 and 13 of a housing for the radio apparatus. The frame member 10 also includes a web 14 extending between the sides 12 and 13, and an end 15 which is not an exposed side of the housing.

The chassis 20 may include an insulating board having conductors thereon which rests on projections 21 molded in the frame member 10. Components extend from the bottom side of the printed circuit board 20 when positioned as shown in FIG. 2, with the components indicated at 23 in FIGS. 4 and 6. An insulating pad 30 is positioned adjacent the chassis 20 to prevent shorting of the conductors thereon. Space is provided in the housing for a battery 24 which is connected to the circuit of the chassis 20.

A cover member 16 is provided which is U-shaped and may be formed from flat metal stock. The cover includes end 17 and sides 18 and 19, which form the second end and a pair of opposite sides of the housing. Grooves 22 are molded in the side walls 12 and 13 of the frame for receiving the sides 18 and 19 provided by the cover. The end wall 17 of the cover has an opening 25 for receiving the actuator of a switch 26 secured to the chassis 20. The chassis may also include a sound transducing device from which sound can pass through opening 27 in the frame 10 and through the openings 29 in the cover to be heard by the user of the device. A retaining clip 28 is provided on the cover 16 so that the pager or other device can be held in a pocket of the user.

The parts shown in exploded positions in FIG. 2 are held assembled by dropping the chassis 20 into the frame 10 and placing the insulating pad 30 on top of the chassis to provide an insulating cover over the circuit conductors thereon. Then the cover 16 is slipped onto the frame member 10, with the sides 18 and 19 within grooves 22 in the side walls 12 and 13 of the frame member. The pad 30 may be of resilient material to hold the chassis against the parts of the frame 10.

The cover 16 is held in closed position on the frame 10 by a detent arrangement which is shown in FIGS. 3, 4 and 5. FIG. 3 shows the back side of the web 14 of the frame member 10. This includes a tongue 32 having a projection 33 at its end. The projection 33 extends into an opening 35 (FIG. 2) in the side 19 of the cover 16, which is positioned under the lip of the retaining clip 28. The projection 33 thus holds the cover 16 in closed position with respect to the frame member 10. Although the tongue 32 and projection 33 are illustrated as integral with the web 14 of the frame, a separate metal clip mounted on the web may be used.

To permit the cover 16 to slide with respect to the frame member 10, a spring biased release button 38 is provided in the clip 28. This has a plunger 39 with an end which engages the projection 33 to push the same into a position clear of the side wall 19. As shown in FIG. 5, the top of the button 38 is elongated and supported only at the ends, and is made of a material so that the center part which supports the plunger 39 can flex to move the projection 33. This allows the cover to slide to the position shown in FIG. 6. In this position the end 19a of the side 19 clears the opening 14a in the web member 14, so that access is provided to the battery 24. The user can, therefore, change the battery and slide the cover closed, with the projection 33 locking in the opening 35 of the cover to hold the cover closed. The opening of the cover 16 to provide access to the battery 24 does not expose the chassis 20, as the movement of the side 18 of the cover to the position shown in FIG. 6 merely exposes a portion of the insulating pad 30, which is between the chassis 20 and the cover side 18.

The cover is held in the position shown in FIG. 6, by a second detent 42 which is at the end of a spring member 43 secured to the cover side 19 by a rivet 41 or the like. The spring member 43 has bent up ears 44 which form the mounting for the clip 28. As shown in FIG. 6, the detent 42 extends through opening 45 in the side 19 of the cover and engages the end 15 of the member 10 to prevent the complete removal of the cover 16 from the frame member 10, when the projection 33 is freed from the opening 35 in the cover side 19. In order to release the detent 42, a tool 46 can be inserted through an opening 47 (FIG. 2) in side 19 to engage the spring 43. The opening 47 is exposed only when the cover is in the position shown in FIG. 6. This makes it possible to flex the spring 43 so that detent 42 clears the end wall 15 of the frame member 10. The detent 42 and the end wall 15 may have slanting surfaces so that the spring 43 automatically flexes when the cover is slid onto the frame member 10.

Figure 10:
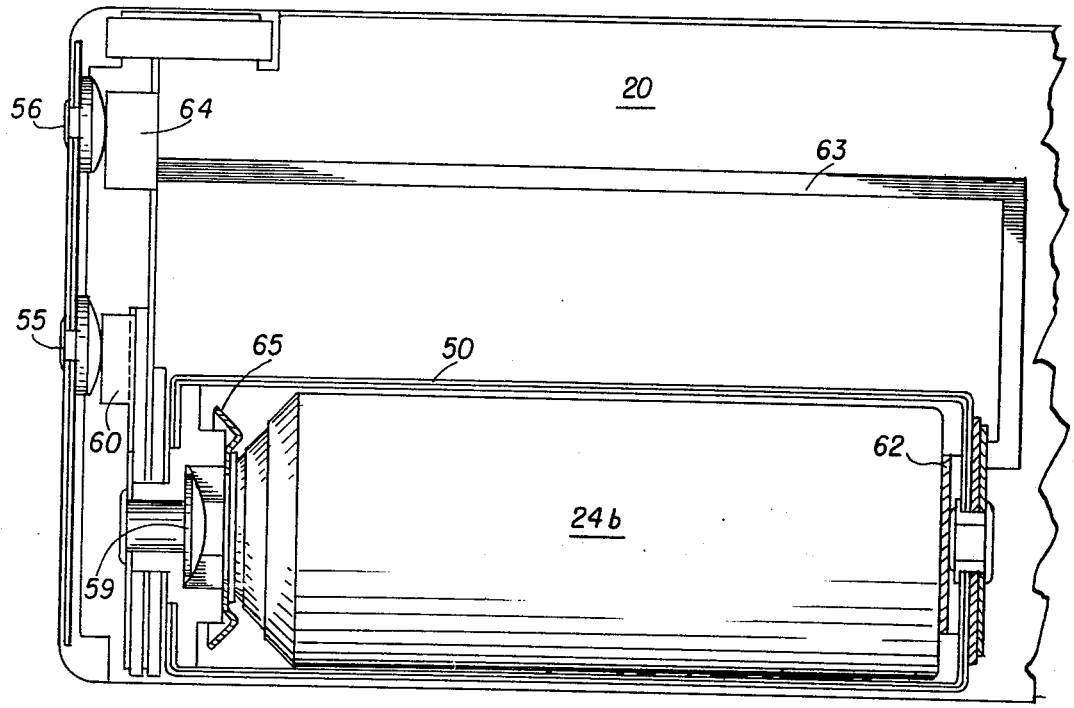

The chassis 20 has a battery retainer 50 preassembled thereon as is clearly shown in FIGS. 9, 10 and 11. The retainer has conducting projections 51 extending through openings 52 in the chassis 20 for connection to the circuit provided on the chassis. An opening 53 (FIG. 11) is provided in the chassis below the battery, and an aligned opening is provided in pad 30, so that the battery can be forced out of the retainer 50 through the opening 14a in the web member 14 (FIG. 6).

FIGS. 9 and 10 show the connecting arrangement whereby either a single use or a rechargeable battery can be used. Connections are made to charging contacts 55 and 56 in the housing so that the battery can be charged without being removed from the housing. The contacts 55 and 56 extend through the wall 11 of the housing so that the radio receiver can be placed in a pocket or recepticle in a charger, which has contacts arranged to engage the charging contacts 55 and 56. This permits recharging the battery without removing the same from the receiver.

FIG. 9 shows a rechargeable battery 24a in the retainer 50, which may be a Nicad battery, which has a projection 58 engaging contact pin 59 supported by the retainer 50. The pin 59 is connected to contact strip 60 which has a resilient part engaging the contact 55 in the housing. A connection is made to the other end of the battery by a resilient clip 62 which has a projection connected to conductor 63 on the printed circuit board 20. A resilient clip 64 connected to the conductor 63 engages the charging contact 56 on the housing. Accordingly, connections are made from the battery terminals to the charging contacts 55 and 56 which permit charging of the battery while in the housing. A resilient contact 65 engages the front end of the battery 24, and has a projection connected to the circuit on the chassis 20 to provide an energizing connection between the battery and the circuit. Inasmuch as the contacts 60 and 64 resiliently engage the charging contacts 55 and 56, the chassis can be removed without removal of fixed connection between the chassis and the housing.

FIG. 10 shows the battery retainer 50 with a non-rechargeable battery 24b therein. Connections to the circuit are made by the resilient connectors 62 and 65 in the same manner described with reference to FIG. 9. However, as the battery 24b does not have a projecting terminal at the end which engages the contact 59, there is no connection between the battery and the charging contact 55. Accordingly, there is not a complete circuit between the battery and the contacts 55 and 56 which can connect the battery to a charger. This arrangement is necessary to prevent damage to the battery, and possibly to the radio receiver, in the event that a radio receiver with a non-rechargeable (Mercury) battery is inadvertently placed in a charger.

The housing assembly described provides a complete housing formed by a frame member and a cover member. The members are held in assembled relation by detents, and no screws or other removable connecting elements are required. This makes it possible to open the housing without the use of a screwdriver or other tool. The chassis includes a retainer for holding a battery which may be either of the single use or rechargeable type, and when a rechargeable battery is used, connections are made to contact pins for charging the same without removal from the housing. The assembled housing has a neat appearance with no screw heads of other fastening devices in view to disturb the styling lines.

We claim:

1. Miniature battery operated radio apparatus including in combination, an elongated frame member having portions forming one end and two opposite elongated sides of a housing, said frame member being adapted to receive a chassis and a battery therein with the battery adjacent said one end of the housing, a U-shaped cover member forming the opposite end and two opposite elongated sides of the housing, said frame member being adapted to receive said cover member in sliding relation thereon, with said elongated sides of said cover member engaging said frame member to hold the same in assembled relation and having a first position with respect to said frame member to form a completely enclosed housing, said cover member being slidable on said frame member to a second position with portions of said elongated sides of said cover member remaining in engagement with said frame member to open said housing adjacent said one end thereof to provide access to a battery therein.

2. Radio apparatus in accordance with claim 1 wherein said frame member is molded of plastic material and has grooves along said opposite elongated sides thereof, and said cover member is formed of sheet metal, with said grooves in said frame member receiving the edges of said elongated sides of said U-shaped cover member.

3. Radio apparatus in accordance with claim 1 wherein the chassis is held in position on said frame member by said cover member, and including insulating means between said cover member and the chassis.

4. Radio apparatus in accordance with claim 1 including a clip secured to said cover member, a detent structure including a portion on said frame member engageable with said cover member when said cover member is in said first position for holding the same in such position, said clip having a portion co-operating with said detent structure to release the same so that said cover member is slidable to said second position to afford access to the battery.

5. Radio apparatus in accordance with claim 4 wherein said frame member has a resilient portion with a projection thereon, and said cover member has an opening therein for receiving said projection, with said resilient portion and said opening forming said detent structure.

6. Radio apparatus in accordance with claim 5 wherein said clip has an opening with a button therein, and a plunger extending from said button at said opening in said cover member and engageable with said projection to move the same to a position so that said cover member is free to slide on said frame member.

7. Radio apparatus in accordance with claim 4 including interengaging portions on said frame member and said cover member to hold the same in said second position, with one of said interengaging portions being resilient to permit release thereof so that said cover member can be removed from said frame member.

8. Radio apparatus in accordance with claim 7 including a resilient arm secured to said cover member and having a projection extending through an opening in said cover member, and a portion on said frame member positioned to be engaged by said projection, said projection and said portion having slanting surfaces so that said resilient arm flexes to permit movement of said cover member from said second position to said first position.

9. Radio apparatus in accordance with claim 1 including interengaging portions on said frame member and said cover member to hold the same in said second position, with one of said interengaging portions being resilient to permit release thereof so that said cover member can be removed from said frame member.

10. Radio apparatus in accordance with claim 9 including a resilient arm secured to said cover member and having a projection extending through an opening in said cover member, and a portion on said frame member positioned to be engaged by said projection.

11. Radio apparatus in accordance with claim 1 including resilient detent means cooperating with said frame member and said cover member to hold said cover member in said first position with respect to said frame member, and to hold said cover member in said second position with respect to said frame member.

12. Radio apparatus in accordance with claim 11 wherein said detent means includes a resilient arm secured to said frame member having a portion which extends into an opening in said cover member.

13. Miniature battery operated radio apparatus including in combination, a frame member, a radio chassis having components and conductor means thereon and retainer means for receiving a battery and making connections thereto, said frame member being adapted to receive said chassis, a cover member cooperating with said frame member in assembled relation to form an enclosing housing about said chassis, said cover member being positioned in sliding relation on said frame member and having a first position with respect to said frame member to form a completely enclosed housing for said radio chassis, said cover member being slidable on said frame member to a second position with respect to said frame member to open said housing to provide access to the battery therein while remaining in engagement with said frame member and partially enclosing said chassis.

14. Radio apparatus in accordance with claim 13 wherein said retainer means is adapted to receive an elongated battery having a terminal at each end thereof, and including connecting means connected to said chassis and having resilient portions engaging the ends of the battery for connecting the same to said chassis, and charging contacts secured to said housing and connected to said connecting means for charging a battery within said housing.

15. Radio apparatus in accordance with claim 14 wherein said connecting means for engaging one end of the battery includes a first part for connecting the battery terminal to said conductor means on said chassis and a second part for connecting the battery terminal to one of said charging contacts, and said second part is adapted to make electrical connection to the terminal of a battery of one configuration and to be insulated from the terminal of a battery of a second configuration.

16. Radio apparatus in accordance with claim 13 wherein said radio chassis forms a complete radio unit independently of said frame member and said cover member, said chassis including control means having an actuating element extending therefrom, and wherein said cover member has an opening therein through which said actuating element extends when said chassis is enclosed by said housing.

* * * * *